United States Patent
Jea et al.

(10) Patent No.: US 12,003,363 B2
(45) Date of Patent: Jun. 4, 2024

(54) AUTOMATICALLY TROUBLESHOOTING AND REMEDIATING NETWORK ISSUES VIA CONNECTED NEIGHBORS

(71) Applicant: Juniper Networks, Inc., Sunnyvale, CA (US)

(72) Inventors: David Jea, San Jose, CA (US); Xiaoying Wu, Sunnyvale, CA (US); Jisheng Wang, Palo Alto, CA (US); Yuan-Hsiang Lee, Broomfield, CO (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/653,608

(22) Filed: Mar. 4, 2022

(65) Prior Publication Data
US 2023/0283514 A1    Sep. 7, 2023

(51) Int. Cl.
*H04L 41/0604* (2022.01)
*H04L 41/0631* (2022.01)
(Continued)

(52) U.S. Cl.
CPC ...... *H04L 41/0627* (2013.01); *H04L 41/0631* (2013.01); *H04L 41/0654* (2013.01); *H04L 41/12* (2013.01)

(58) Field of Classification Search
CPC ............. H04L 41/0627; H04L 41/0631; H04L 41/0654; H04L 41/12
See application file for complete search history.

(56) References Cited

U.S. PATENT DOCUMENTS 9,832,082 B2    11/2017    Dade et al.
10,862,742 B2    12/2020    Singh
(Continued)

FOREIGN PATENT DOCUMENTS

EP    3706370 A1    9/2020

OTHER PUBLICATIONS

U.S. Appl. No. 17/303,222, filed May 24, 2021, naming inventor Safavi.
(Continued)

*Primary Examiner* — Philip J Chea
*Assistant Examiner* — James Ross Hollister
(74) *Attorney, Agent, or Firm* — Shumaker & Sieffert, P.A.

(57) ABSTRACT

An example system includes network devices at a site; and a network management system (NMS) that is configured to: identify a first network device of the plurality of network devices with which a network connection has been lost; identify, based on a network topology graph generated from the network data, one or more neighbor network devices of the plurality of network devices that are connected to the first network device; perform root cause analysis of the lost connection with the first network device based on the network data to identify a root cause of the lost connection; and send, to a neighbor network device selected from the one or more neighbor network devices and based on the identified root cause, instructions for the first network device to perform an action to remediate the lost connection, wherein the neighbor network device communicates the instructions to the first network device.

19 Claims, 7 Drawing Sheets

(51) Int. Cl.
*H04L 41/0654* (2022.01)
*H04L 41/12* (2022.01)

(56) References Cited

U.S. PATENT DOCUMENTS

| | | |
|---|---|---|
| 10,958,537 B2 | 3/2021 | Safavi |
| 10,958,585 B2 | 3/2021 | Safavi |
| 10,985,969 B2 | 4/2021 | Safavi |
| 2013/0227336 A1* | 8/2013 | Agarwal ................ H04L 45/02 |
| | | 714/4.3 |
| 2018/0069771 A1* | 3/2018 | Dade ................... H04L 41/0604 |
| 2019/0165988 A1* | 5/2019 | Wang .................... H04L 41/064 |
| 2020/0287782 A1* | 9/2020 | Singh ................. H04L 41/0631 |
| 2021/0306201 A1 | 9/2021 | Wang et al. |

OTHER PUBLICATIONS

U.S. Appl. No. 63/300,166, by Juniper Networks, Inc., filed Jan. 17, 2022.

Extended Search Report from counterpart European Application No. 22217041.7 dated Jul. 13, 2023, 9 pp.

Response to Extended Search Report dated Jul. 13, 2023, from counterpart European Application No. 22217041.7 filed Mar. 5, 2024, 40 pp.

\* cited by examiner

AUTOMATICALLY TROUBLESHOOTING AND REMEDIATING NETWORK ISSUES VIA CONNECTED NEIGHBORS

FIELD

The disclosure relates generally to computer networks and, more specifically, to troubleshooting and remediating network connectivity issues via connected neighbor devices.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Network providers and organizations (e.g., enterprises) may have networks that include multiple layers of gateways, routers, switches, and access points. Commercial premises or sites, such as offices, hospitals, airports, stadiums, or retail outlets, often install complex wired and wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network.

Further, organizations and network providers may use software-defined networking in a wide area network (SD-WAN) to manage network connectivity among distributed locations (e.g., sites), such as remote branch or central offices or data centers. SD-WAN extends SDN to enable businesses to create connections quickly and efficiently over the WAN, which may include the Internet or other transport networks that offer various WAN connection types, such as Multi-Protocol Label Switching (MPLS)-based connections, mobile network connections (e.g., 3G, Long-Term Evolution (LTE), 5G), Asymmetric Digital Subscriber Line (ADSL), and so forth. Such connections are typically referred to as "WAN links" or, more simply, as "links." SD-WAN is considered a connectivity solution that is implemented with WAN links as an overlay on top of traditional WAN access, making use of the above or other WAN connection types.

SUMMARY

In general, this disclosure describes techniques troubleshooting connectivity issues with network devices in a network, and automatically remediating such connectivity issues via a network device that is a network neighbor to the device experiencing connectivity issues. The network analysis system can receive various forms of telemetry data from the network devices, and from such telemetry data, can determine an organization's network topology, including current network device connectivity and, in some cases, past connectivity. The network management system can store the network topology as a network topology graph.

A technical problem with remotely administered networks such as cloud-based administered networks involves how to handle disconnected devices, such as access points, switches or routers that can no longer communicate with the cloud. In existing systems, when a device becomes disconnected from the cloud, it may be unclear whether the issue causing the disconnection is device-side or cloud-side. Existing cloud-based administration system are typically unable to perform troubleshooting with respect to the disconnected device to identify the cause of the disconnection and/or remediate the disconnection because there is no administration system (or even a human network administrator) "on site" that can directly reach a disconnected device.

The techniques disclosed herein may be included in a practical application that provides technical advantages over existing systems. For example, a network management system can periodically or on demand receive telemetry data from network devices (e.g., switches, routers, gateways APs etc.) The network management system can utilize the telemetry data to build a network topology graph that indicate which devices are network neighbors. The network management system can determine that a network device has become disconnected from the cloud and/or the network management system. The network management system can determine, from the telemetry data, a root cause for the disconnection of the network device and an action to remediate the disconnection. The network management system can determine, using the network topology graph, a closest network neighbor device to the disconnected device, and send the action to remediate the disconnection to the network neighbor device. The network neighbor device can then communicate the action to the disconnected device to remediate the disconnection. Thus, the disconnection of a network device can be automatically detected and remediated without requiring network administrators or other parties to be on-site. This can result in troubleshooting and remediating a network device disconnection in less time, resulting in greater network user and network operator satisfaction with the services provided by the network.

In one example, a system includes a plurality of network devices configured to provide a network at a site; and a network management system (NMS) comprising: a memory storing network data received from the plurality of network devices; and one or more processors coupled to the memory and configured to: identify a first network device of the plurality of network devices with which a network connection has been lost; identify, based on a network topology graph generated from the network data, one or more neighbor network devices of the plurality of network devices that are connected to the first network device; perform root cause analysis of the lost connection with the first network device based on the network data to identify a root cause of the lost connection; and send, to a neighbor network device selected from the one or more neighbor network devices and based on the identified root cause, instructions for the first network device to perform an action to remediate the lost connection, wherein the neighbor network device communicates the instructions to the first network device.

In another example, a method includes receiving, by processing circuitry of a network management system (NMS), network data from a plurality of network devices configured to provide a network; identifying, by the processing circuitry, a first network device of the plurality of network devices with which a connection has been lost; identifying, by the processing circuity and based on a network topology graph built from the network data, one or more neighbor network devices of the plurality of network devices that are connected to the first network device; performing, by the processing circuitry, root cause analysis of the lost connection with the first network device based on the network data to identify a root cause of the lost connection; and sending, by the processing circuitry to a neighbor network device selected from the one or more neighbor network devices and based on the identified root cause, instructions for the first network device to perform an action to remediate the lost connection, wherein the neighbor network device communicates the instructions to the first network device.

In another example, a computer-readable medium includes instructions stored thereon that, when executed, cause one or more processors to: receive network data from a plurality of network devices configured to provide a network; identify a first network device of the plurality of network devices with which a connection has been lost; identify, based on a network topology graph built from the network data, one or more neighbor network devices of the plurality of network devices that are connected to the first network device; perform root cause analysis of the lost connection with the first network device based on the network data to identify a root cause of the lost connection; and send, to a neighbor network device selected from the one or more neighbor network devices and based on the identified root cause, instructions for the first network device to perform an action to remediate the lost connection, wherein the neighbor network device communicates the instructions to the first network device.

The details of one or more examples are set forth in the accompanying drawings and the description below. Other features, objects, and advantages will be apparent from the description and drawings, and from the claims.

DETAILED DESCRIPTION

Figure 1A:
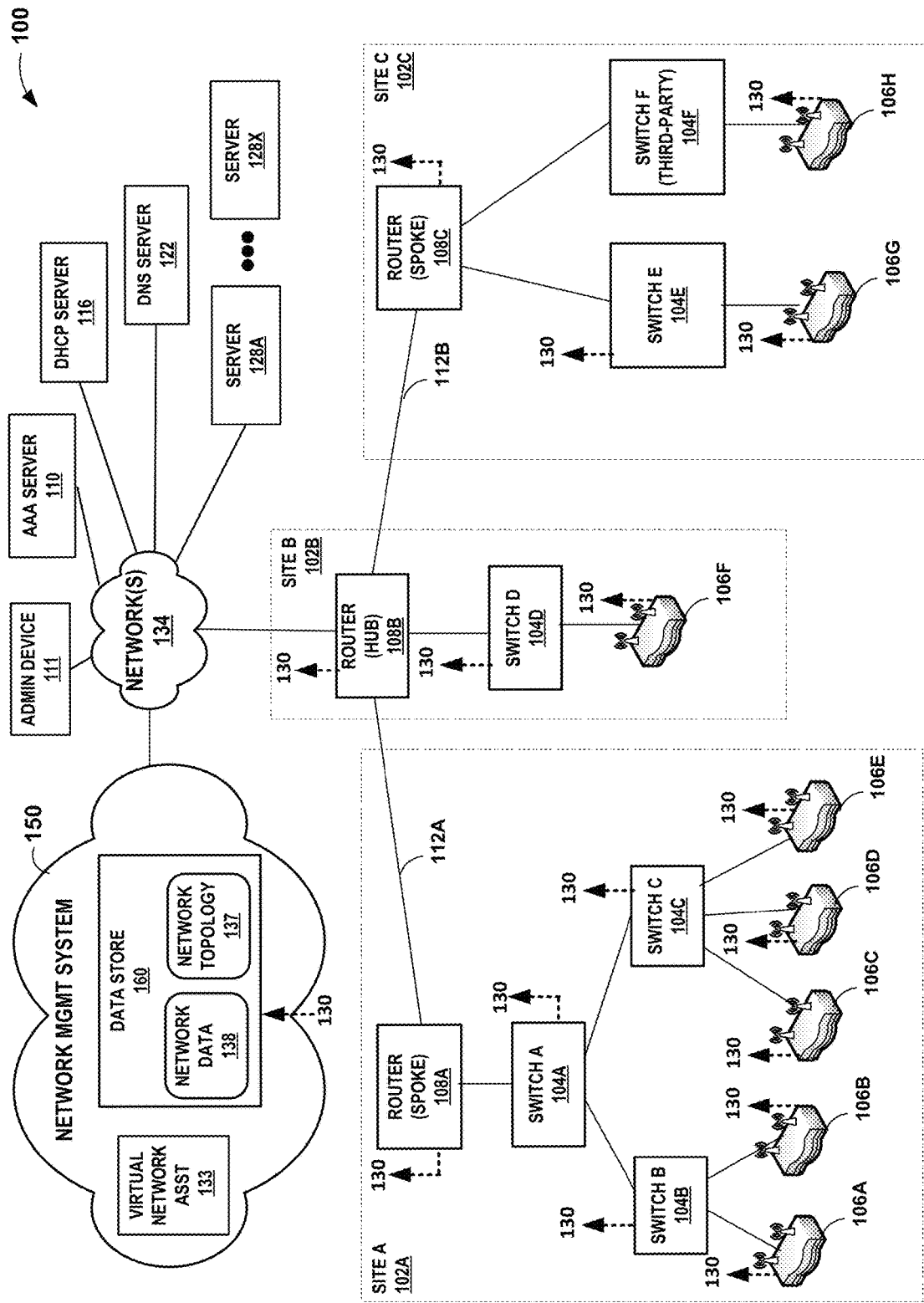
FIGS. 1A-1C are block diagrams of example network systems, in accordance with one or more techniques of the disclosure.

FIG. 1A is a block diagram of an example network system 100 in which a network management system (NMS) 150 automatically troubleshoots and remediates network connectivity, according to one or more techniques of the disclosure. In the example shown in FIG. 1A, an organization includes three sites 102A-102C arranged in a "hub and spoke" architecture, with site 102B being the hub site and sites 102A and 102C being spoke sites. As an example, the organization may be a large corporation with multiple campuses, where each campus may be a site. Generally speaking, a site may refer to a geographic location. The organization may have sites in different cities, sites that are different campuses within a city, sites that are different buildings within a campus, etc. In some examples, network topologies other than hub and spoke may be used. For example, the network may be a partial mesh topology, a full mesh topology, or other network topology. Further, the network topology may be a hybrid topology. For example, the hubs and sites may be arranged in a hub and spoke topology while internal to a site, the network may have a mesh topology.

Network system 100 also includes switches 104A-104F (collectively "switches 104") and access points (APs) 106A-106H. Each AP 106 may be any type of wireless access point, including, but not limited to, a commercial or organization AP, a wireless router, or any other device capable of providing wireless network access.

Site 102B includes router 108B which is configured as a hub router. Router 108B is configured to communicate with spoke router 108A at site 102A via wide area network (WAN) link 112A. Router 108B is configured to communicate with spoke router 108C at site 102C via WAN link 112B. Further, router 108B is configured to communicate with network 134. Router 108B is also configured to communicate with switch 104E, which is configured to communicate with access point 106F.

In addition to router 108A, site 102A includes switch 104A that is communicatively coupled to switches 104B and 104C. Switch 104B is communicatively coupled to access points 106A and 106B. Switch 104C is communicatively coupled to access points 106C-106E.

In addition to router 108C, site 102C includes switches 104E and 104F. Switch 104E is communicatively coupled to access point 106G and switch 104F is communicatively coupled to AP 106H.

Various clients (not shown in FIG. 1A) may be communicatively coupled to the access points 106 shown in FIG. 1A. A client of an access point may be any type of wireless client device, including, but not limited to, a mobile device such as a smart phone, tablet or laptop computer, a personal digital assistant (PDA), a wireless terminal, a smart watch, smart ring or other wearable device. A client may also be an IoT device such as a printer, security device, environmental sensor, or any other device configured to communicate over one or more wireless networks.

Example network system 100 also includes various networking components for providing networking services within the wired network including, as examples, an Authentication, Authorization and Accounting (AAA) server 110 for authenticating users and/or client devices, a Dynamic Host Configuration Protocol (DHCP) server 116 for dynamically assigning network addresses (e.g., IP addresses) to client devices upon authentication, a Domain Name System (DNS) server 122 for resolving domain names into network addresses, a plurality of servers 128 (e.g., web servers, databases servers, file servers and the like.

During operation, devices in network system 100 may collect and communicate telemetry information 130 to NMS 150. Telemetry information 130 may vary depending on the type of device providing the information and whether or not the device is configured to provide telemetry information. NMS 150 can store the received telemetry information 130, along with other data about network system 100, as network data 138. NMS 150 may obtain telemetry data 130 using a "push" model or a "pull" model. In a pull model, NMS 150 may poll network devices in network system 100 and request that the network devices send their respective telemetry data 130 to NMS 150. In a push model, the various network devices of network system 100 periodically send telemetry data 130 to NMS 150 without NMS 150 having to request telemetry data 130.

In some aspects, AP 106 may provide AP telemetry data that includes information regarding AP connectivity to other network devices. For example, the AP telemetry data may include data identifying the number of clients connected to the AP and a switch connected to the AP. In some aspects, an AP 106 may provide Link Layer Discovery Protocol (LLDP) data as part of telemetry data 130. Link Layer Discovery Protocol (LLDP) is a layer 2 neighbor discovery protocol that allows devices to advertise device information to their directly connected peers/neighbors. An AP 106 may provide LLDP data to identify a wired connection to a switch. AP 106 may also report information on client devices connected to the AP. In some aspects, NMS 150 may treat information about clients received from an AP as a separate source from the AP, e.g., NMS 150 treats the client information as if it came from the client device rather than the AP device. Clients and client connectivity data have relatively high volume compared to other entities in the network. In some aspects, an AP may periodically report telemetry data to NMS 150 (e.g., every minute).

Similarly, a switch 104 may provide AP telemetry data regarding connectivity to an AP 106. Switches 104 may also provide switch telemetry information regarding connectivity to other switches, routers, gateways etc. In some aspects, switches 104 may provide LLDP data identifying the switch reporting the LLDP data and identifying devices connected to ports of the switch and the types of ports.

Other devices such as routers and gateways may also provide telemetry information such as LLDP data. Additionally, gateway devices (e.g., routers 108) may report both wired connections and virtual or logical connections. A given network device may establish multiple logical paths (e.g., peer paths or tunnels) over a WAN with multiple other network devices on a single physical interface. Each of the network devices may include a software agent or other module configured to report path data collected at a logical path level to NMS 150 in the cloud and/or the path data may be retrieved from the network devices by NMS 150 via an application programming interface (API) or protocol. In some aspects, the telemetry data may include labels identifying the network device as a hub or data center router. In some aspects, the telemetry data may identify the router as a spoke router (e.g., a branch office router).

In examples where routers 108 include session-based routers, a given session-based router may establish multiple peer paths over the WAN with multiple other session-based routers on a single physical interface. Each of the session-based routers may include a software agent imbedded in the session-based router configured to report the path data collected at a peer path level to the NMS in the cloud. In examples where the network devices comprise packet-based routers, a given packet-based router may establish multiple tunnels over the WAN with multiple other packet-based routers on a single physical interface. Each of the packet-based routers may collect data at a tunnel level, and the tunnel data may include the tunnel data as part of telemetry data 130 reported to NMS 150.

Gateway devices may also report network session data such as session flow data. Session flow data can include source and destination client IP addresses and session duration for a network session between two network devices.

In the example of FIG. 1A, network management system (NMS) 150 can receive telemetry data 130 and can process the telemetry data to create and maintain network topology 137. In this example, NMS 150 can be a cloud-based computing platform that implements various techniques of the disclosure. In accordance with the techniques described herein, NMS 150 may monitor telemetry data 130 received from the various devices of network system 100, and may store the received data in data store 160 as part of network data 138. Workflows of NMS 150 can periodically process network data 138 to create network topology 137. Network topology 137 can represent network connectivity in network system 100. In some aspects, network topology 137 is a temporal network topology that can represent current and past network connectivity and can also capture changes in properties of network connections. Once created, network topology 137 may be used by other applications, for example, virtual network assistant 133. Virtual network assistant 133 may be a network analysis application, a network management application, a network reporting application, a network visualization application, a network troubleshooting application and the like.

In some implementations, some or all of routers 108, switches 104, and APs 106 may be from the same manufacturer, or may provide telemetry data 130 that conforms to a format or protocol that is known to NMS 150. However, it may be the case that some network devices in network system 100 do not provide telemetry data 130, or do not provide data according to format or protocol known to NMS 150. Such network devices may be referred to as third-party network devices. For instance, in the example illustrated in FIG. 1A, switch 104F does not provide telemetry data 130 to NMS 150 and is thus a third-party network device. In such cases, NMS 150 can use techniques to infer the existence of devices like switch 104F that do not provide telemetry data 130. In the example of FIG. 1A, AP 106H is connected to third-party switch 104F and does report telemetry data 130. Additionally, router 108C is connected to third-party switch 104F and reports telemetry data 130. NMS 150 may use telemetry data from router 108C and/or AP 106H to infer the existence of switch 104F and connection properties of switch 104F even though switch 104F itself may not report such information.

As shown in FIG. 1A, the various devices and systems of network 100 are coupled together via one or more network(s) 134, e.g., the Internet and/or an enterprise intranet. Each one of the servers 110, 116, 122, 128, switches 104, routers 108, APs 106, NMS 150, and any other servers or devices attached to or forming part of network system 100 may include a system log or an error log module wherein each one of these devices records the status of the device including normal operational status and error conditions.

In the example of FIG. 1A, NMS 150 is a cloud-based computing platform that manages networks and network devices at one or more of sites 102A-102C. In accordance with one specific implementation, a computing device is part of NMS 150. In accordance with other implementations, NMS 150 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In accordance with the techniques described herein, NMS 150 monitors network data such as telemetry data 130 associated with networks and network devices at each site 102A-102C, respectively, and manages network resources, such as routers 108, switches 104, and/or APs 106 at each site, to deliver a high-quality networking experience to end users, IoT devices and clients at the site. The telemetry data received by NMS 150 may be stored in a data store 160 as network data 138. In addition, NMS 150 may use network data 138 to determine network topology 137. Techniques for determining network topology 137 used in some implementations may be found in U.S. Provisional Patent Application Ser. No. 63/300,166, filed on Jan. 17, 2022, and entitled "DETERMINING AN ORGANIZATIONAL LEVEL NETWORK TOPOLOGY," the entirety of which is incorporated by reference herein.

In general, NMS 150 may provide a cloud-based platform for network data acquisition, monitoring, activity logging, reporting, predictive analytics, network anomaly identification, invoking remedial actions, and alert generation. For example, NMS 150 may include a virtual network assistant (VNA) 133 that analyzes network data 138, provides real-time insights and simplified troubleshooting for IT operations, and automatically takes corrective action or provides recommendations to proactively address various wired and wireless network issues, including network connectivity issues. VNA 133 may, for example, include a network data processing platform configured to process hundreds or thousands of concurrent streams of network data from sensors and/or agents associated various devices in network system 100 (e.g., routers 108, switches 104, and/or APs 106) and/or nodes within network 134. VNA 133 may provide real-time alerting and reporting to notify administrators of any predicted events, anomalies, trends, and may perform root cause analysis and automated or assisted error remediation.

In some examples, VNA 133 of NMS 150 may apply machine learning techniques to identify the root cause of network disconnections, error conditions or poor wired or wireless network performance metrics detected or predicted from the streams of event data. For example, in some aspects, VNA 133 may utilize a machine learning model that has been trained using either supervised or unsupervised machine learning techniques to identify the root cause of error conditions or poor network performance based on network data. VNA 133 may generate a notification indicative of the root cause and/or one or more corrective or remedial actions that may be taken to address the root cause of the error conditions or poor wireless network performance metrics. If the root cause may be automatically resolved, VNA 133 can automatically invoke one or more corrective actions to correct the root cause of the network disconnection, error condition or poor network performance metrics.

Example details of these and other operations implemented by the VNA 133 and/or NMS 150 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In operation, NMS 150 observes, collects and/or receives telemetry data 130 and stores the telemetry data 130 as part of network data 138. The network data is indicative of one or more aspects of wired or wireless network performance. Network data 138 may take the form of data extracted from messages, counters and statistics, for example. The network data may be collected and/or measured by one or more network devices in a wired or wireless network of a site 102 (e.g., routers 108, switches 104, APs 106 etc.). Some of the network data may be collected and/or measured by other devices in the network system 100. In accordance with one specific implementation, a processor or computing device is part of the network management server 150. In accordance with other implementations, NMS 150 may comprise one or more processors, processing circuitry, computing devices, dedicated servers, virtual machines, containers, services or other forms of environments for performing the techniques described herein. Similarly, computational resources and components implementing VNA 133 may be part of the NMS 150, may execute on other servers or execution environments, or may be distributed to nodes within network system 100 (e.g., routers, switches, controllers, gateways and the like).

NMS 150 can detect that a network connection with a network device has been lost or dropped. In response to detecting a disconnection with a network device (e.g., a lost or dropped connection), NMS 150 can determine a root cause of the disconnection. For example, NMS 150 can process network data 138 using a machine learning model trained to determine root causes of network disconnection, errors, and/or low network performance based on network data 138. Upon determining the root cause of a disconnection, NMS 150 can determine remedial actions to cause a disconnected network device to be reconnected to a network. In some aspects, NMS 150 can send instructions to perform the remedial actions to a neighbor network device of a disconnected device. The neighbor network device can relay the instructions to perform remedial actions to the disconnected network device. Upon performing the remedial actions, the formerly disconnected network device may become reconnected to the network.

Although the techniques of the present disclosure are described in this example as performed by NMS 150, it shall be understood that techniques described herein may be performed by any other computing device(s), system(s), and/or server(s), and that the disclosure is not limited in this respect. For example, one or more computing device(s) configured to execute the functionality of the techniques of the disclosure may reside in a dedicated server or be included in any other server (such as any of servers 128A-128N) in addition to or other than NMS 150, or may be distributed throughout network 100, and may or may not form a part of NMS 150.

FIG. 1A has shown an example network system 100 having three sites. A network system may have fewer or more sites than those illustrated in FIG. 1A. Additionally, sites may have a fewer or greater number network devices such as routers 108, switches 104 and APs 106 than shown in FIG. 1A.

Figure 1B:
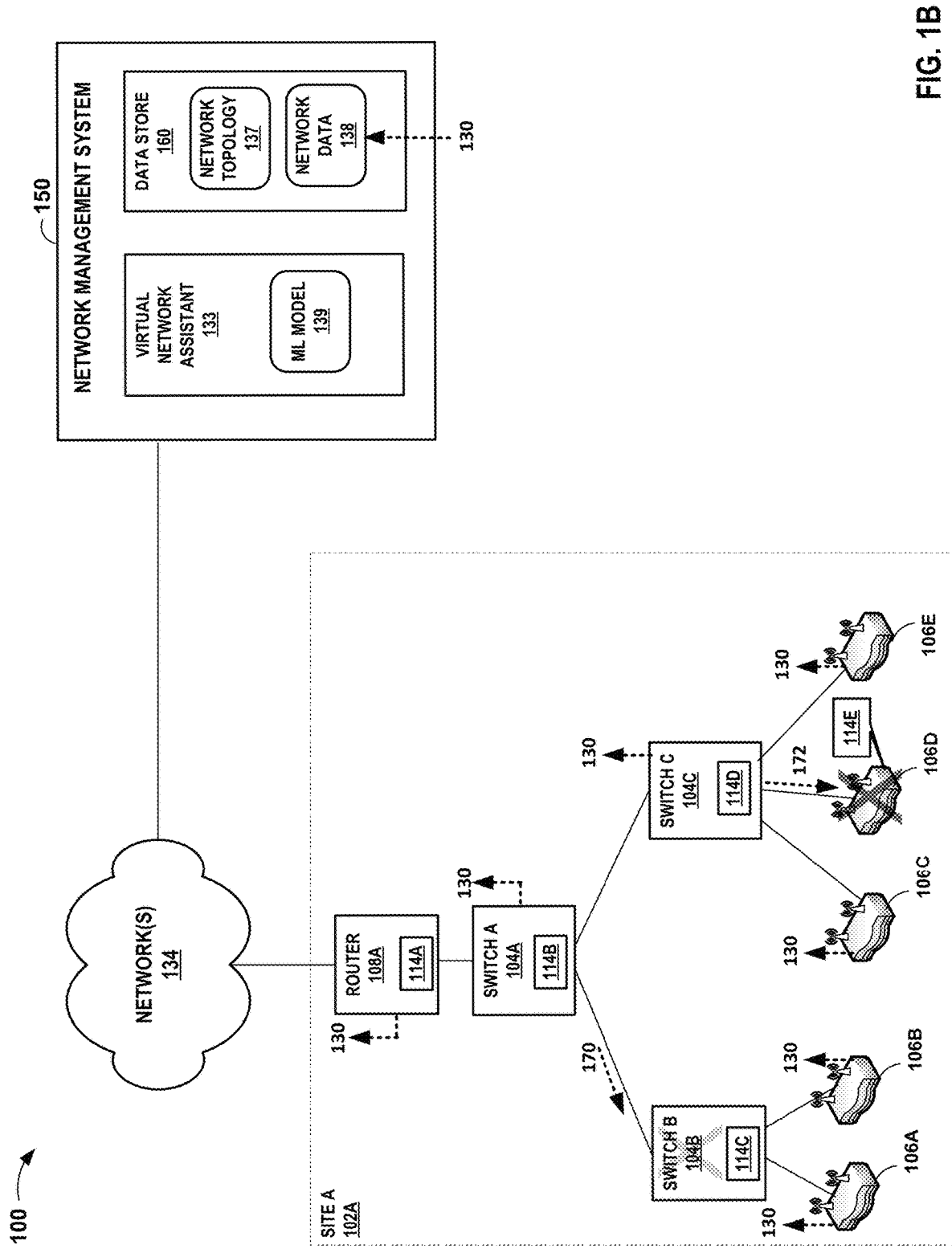

FIG. 1B is a block diagram illustrating further example details of the network system 100 of FIG. 1A. In this example, FIG. 1B illustrates NMS 150 configured to operate according to an artificial intelligence/machine-learning-based computing platform providing troubleshooting and automatic remediation of disconnections of network devices from network 134 and/or NMS 150. The example illustrated in FIG. 1B is presented in the context of the disconnection of one or more network devices in the network of site 102A of FIG. 1A.

In the example shown in FIG. 1B, network devices such as router 108A, switches 104A-104C, and APs 106A-106E each have a respective network management agent, including network management agents 114A-114E. In some aspects, the network management agents may establish network tunnels with NMS 150 via network 134, and transfer telemetry data 130 regarding their corresponding network devices via the tunnels to NMS 150.

At some point during the operation of network system 100, a network device may become disconnected from network 134 and/or NMS 150. In some aspects, NMS 150 may detect that a network device has become disconnected when NMS 150 ceases to receive telemetry data 130 from the network device. In some aspects, NMS 150 may detect the network device has become disconnected by periodically polling network devices. For example, NMS 150 may poll a network device by polling the corresponding agent 114 of the device. If the agent 114 does not respond to the poll, NMS 150 can determine that the device is disconnected. If the network device fails to respond to the poll, NMS 150 can determine that the device is disconnected. In some aspects, NMS 150 can determine that a device has become disconnected in response to a change in the network topology graph that indicates that the network device is no longer connected. While a network device may be disconnected from network 134 and/or NMS 150, the network device may retain what is referred to as "local connectivity." Local connectivity refers to the case where the network device is disconnected from network 134 and/or NMS 150, but is still able to communicate with other network devices of a site.

In a first example shown in FIG. 1B, NMS 150 has detected that switch 104B has become disconnected from network 134 and/or NMS 150, i.e., a connection between switch 104B and network 134 (and/or NMS 150) has been lost or dropped. In this example, switch 104B is still able to communicate with switch 104A, and thus switch 104B has local connectivity within the network of site 102A. In response to determining that switch 104B has become disconnected, VNA 133 of NMS 150 may troubleshoot the disconnection to determine a root cause of the disconnection. For example, VNA 133 may process network data 138 using machine learning model 139 to determine a root cause of the disconnection.

In the case that VNA 133 is able to determine a root cause of the disconnection, VNA 133 may select an action to remediate the lost connection based on the root cause of the disconnection. After selecting the action to remediate the lost connection to switch 104B, VNA 133 can determine a neighbor network device that is locally connected to switch 104B. In some aspects, VNA 133 may utilize network topology 137 to determine the network devices that are network neighbors to switch 104B. In the example shown in FIG. 1B, VNS 133 can determine that switch 104A is locally connected to switch 104B using network topology 137. NMS 150 sends, to switch 104A, instructions 170 for switch 104B to perform the action to remediate the lost connection to switch 104A and instructs switch 104A to communicate the instructions to perform the action to remediate the lost connection to switch 104B. For example, NMS 150 can send instructions 170 to network management agent 114B, which in turn can relay the instructions to network management agent 114C. Network management agent 114C can perform the action(s) to remediate its lost connection with network 134 and/or NMS 150.

In a second example shown in FIG. 1B, NMS 150 has detected that AP 106D has become disconnected from network 134 and/or NMS 150. In this example, AP 106D is still able to communicate with switch 104C and APs 106C and 106E, and thus has local connectivity within site 102A. In response to determining that AP 106D has become disconnected, VNA 133 of NMS 150 may troubleshoot the disconnection to determine a root cause of the disconnection. For example, VNA 133 may process network data 138 using machine learning model 139 to determine a root cause of the disconnection of AP 106D.

In the case that VNA 133 is able to determine a root cause of the disconnection, VNA 133 may select an action to remediate the lost connection based on the root cause of the disconnection. There may be multiple actions that can remediate the lost connection to AP 106D. In such cases, VNA 133 can select the action that has the least impact on (e.g., is the least disruptive to) the users of the network. For example, in the case of an access point, it is often less disruptive to reset a radio of the access point rather than resetting or rebooting the access point. Thus, VNA 133 may select resetting a radio on an access point when the root cause of the disconnection is the radio.

After selecting the action to remediate the lost connection to switch 104B, VNA 133 can determine a neighbor network device that is locally connected to switch 104B. In some aspects, VNA 133 may utilize network topology 137 to determine the network devices that are network neighbors to switch 104B. In this second example shown in FIG. 1B, VNS 133 can determine that switch 104C and APs 106C and 106D are locally connected to switch 104B using network topology 137. NMS 150 may select a nearest neighbor network device. In some aspects, NMS 150 can select the nearest network neighbor device based on network topology 137. For example, NMS 150 can select a network neighbor device that is one hop away from the disconnected network device. In some aspects, NMS 150 can select the nearest network neighbor device based on a signal strengths between the network devices, such as a received signal strength indicator (RSSI). In this example, NMS 150 selects switch 104C as the nearest network neighbor device. NMS 150 sends, to switch 104C, instructions 172 for AP 106D to perform the action to remediate the lost connection to network 134 and/or NMS 150 and instructs switch 104C to communicate the instructions to perform the action to remediate the lost connection to AP 106D. For example, NMS 150 can send instructions 172 to network management agent 114D or switch 104C, which in turn can relay the instructions to network management agent 114E of AP 106D. Network management agent 114E can perform the action(s) to remediate its lost connection with network 134 and/or NMS 150.

Figure 1C:
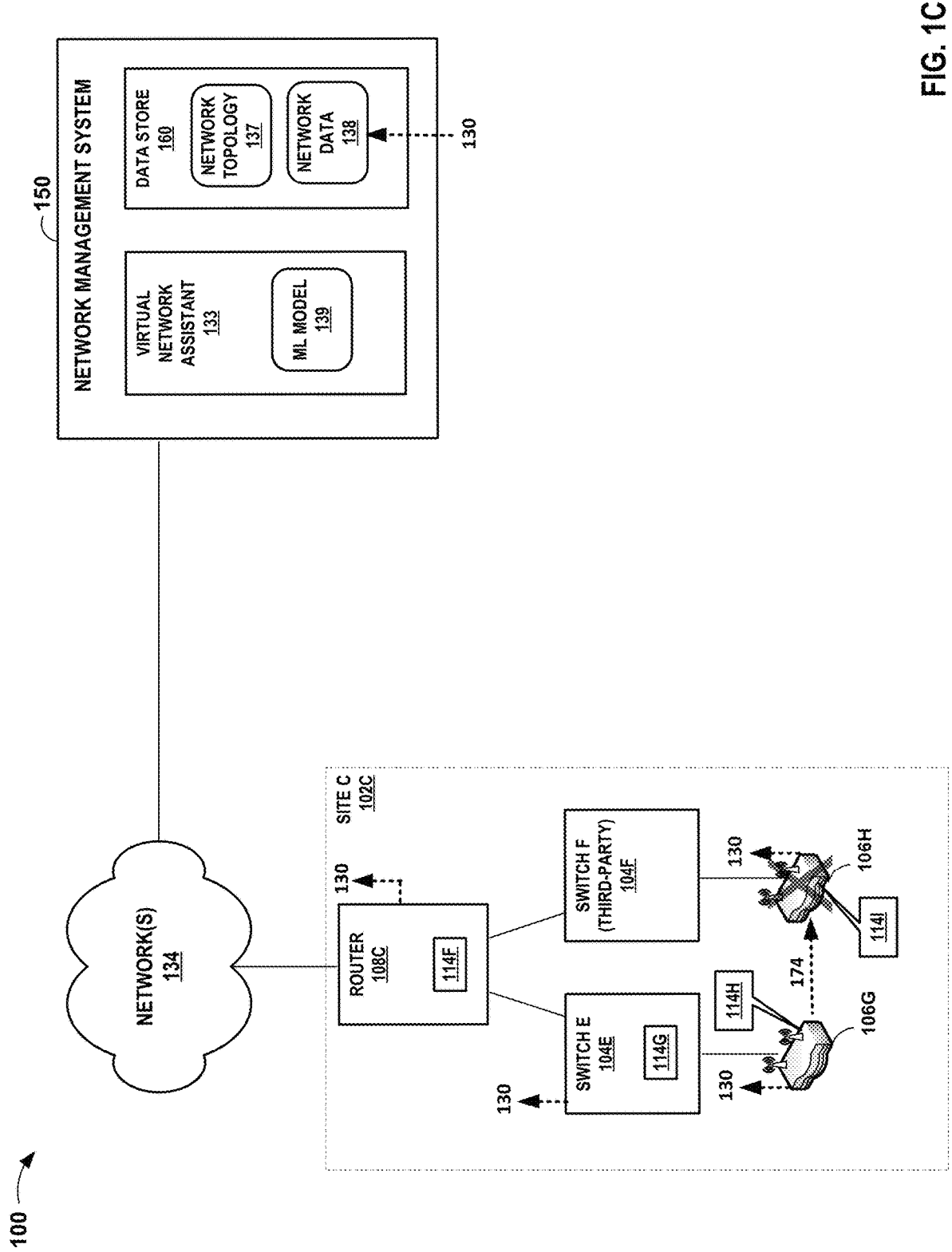

FIG. 1C is a block diagram illustrating further example details of the network system 100 of FIG. 1A. In this example, FIG. 1C illustrates NMS 150 configured to operate according to an artificial intelligence/machine-learning-based computing platform providing troubleshooting and automatic remediation of disconnections of network devices from network 134 and/or NMS 150. The example illustrated in FIG. 1C is presented in the context of the disconnection of one or more network devices in the network of site 102C of FIG. 1A.

In the example shown in FIG. 1C, network devices such as router 108C, switches 104E, and APs 106G and 106H each have a respective network management agent, including network management agents 114F-114I. In some aspects, the network management agents 114 may establish network tunnels with NMS 150 via network 134, and transfer telemetry data 130 regarding their corresponding network devices via the tunnels to NMS 150. In the example shown in FIG. 1C, switch 104F is a third-party switch, and thus may not have a network management agent that communicates with NMS 150.

In the example shown in FIG. 1C, NMS 150 has detected that AP 106H has become disconnected from network 134 and/or NMS 150, i.e., a connection between AP 106H and network 134 (and/or NMS 150) has been lost or dropped. In this example, AP 106G is still able to communicate with AP 106H, and thus AP 106H has local connectivity within the network of site 102A. In response to determining that AP 106H has become disconnected, VNA 133 of NMS 150 may troubleshoot the disconnection to determine a root cause of the disconnection. For example, VNA 133 may process network data 138 using machine learning model 139 to determine a root cause of the disconnection.

In the case that VNA 133 is able to determine a root cause of the disconnection, VNA 133 may select an action to remediate the lost connection based on the root cause of the disconnection. After selecting the action to remediate the lost connection to AP 106H, NMS 150 can determine a neighbor network device that is locally connected to AP 106H. In some aspects, NMS 150 may utilize network topology 137 to determine the network devices that are network neighbors to AP 106H. In some aspects, NMS 150 may utilize RSSI to determine a nearest network neighbor. In the example shown in FIG. 1C, NMS 150 can determine that switch 104F is a third-party network device. While switch 104F may be locally connected to AP 106H, VNA 133 may not select switch 104F as a network neighbor device because it is a third-party device. In this example, NMS 150 selects AP 106G as the nearest network neighbor, perhaps based on signal strength. NMS 150 sends, to switch AP 106G, instructions 174 for AP 106H to perform the action to remediate the lost connection and instructs AP 106G to communicate the instructions 174 to perform the action to remediate the lost connection to AP 106H. For example, NMS 150 can send instructions 174 to network management agent 114H on AP 106G, which in turn can relay the instructions to network management agent 114I on AP 106H. Network management agent 114I can perform the action(s) to remediate its lost connection with network 134 and/or NMS 150.

Figure 2:
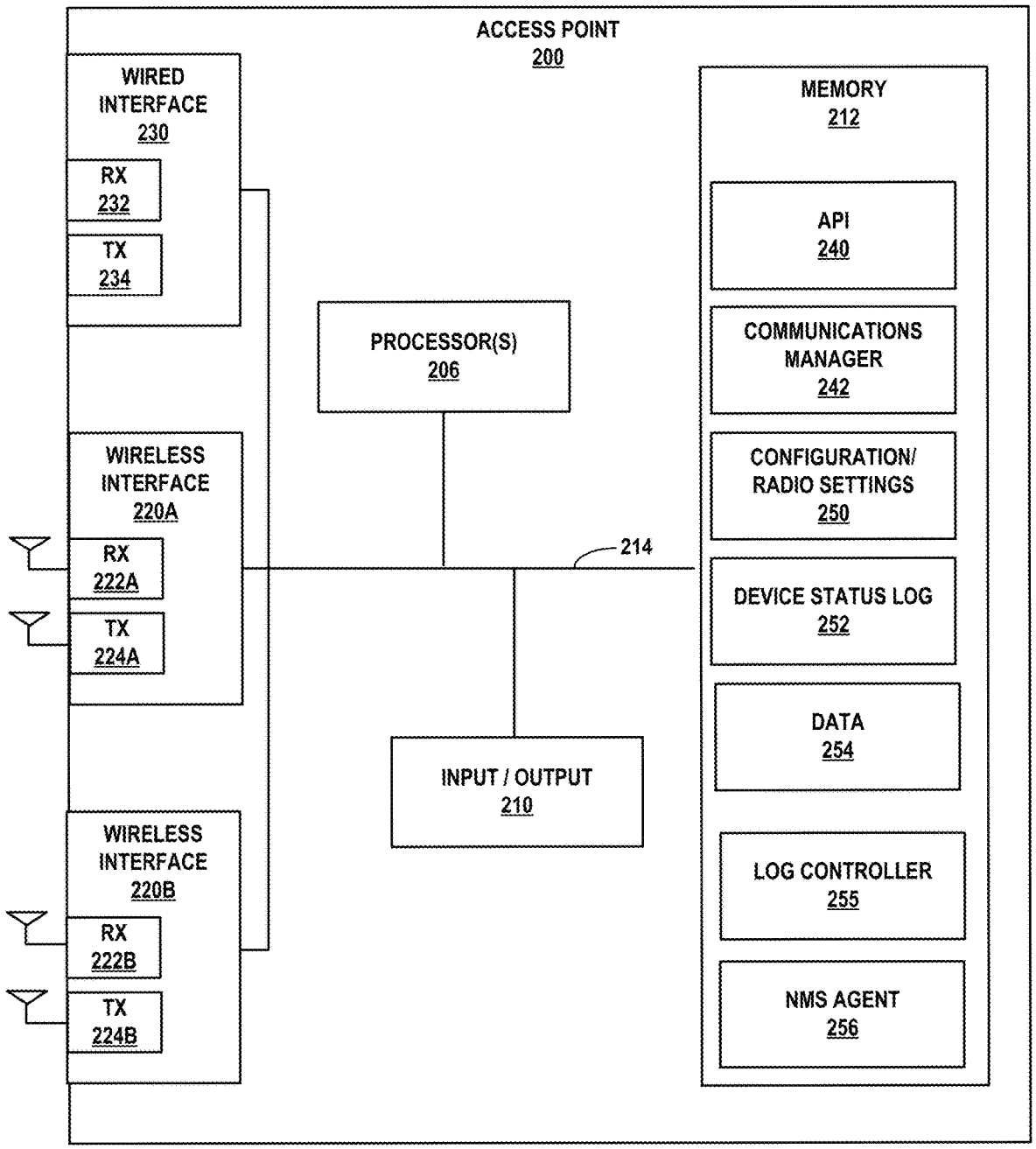
FIG. 2 is a block diagram of an example access point device, in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of APs 106 as shown and described herein with respect to FIGS. 1A-1C. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as laptop computers, smartphones, tablets, wearable devices, appliances, and Internet of Things (IoT) devices. First and second wireless interfaces 220A and 220B further include transmitters 224A and 224B, respectively, each including transmit antennas via which access point 200 may transmit wireless signals to wireless communications devices. In some aspects, first and second wireless interfaces 220A and 220B may communicate with wireless interfaces of other APs. In some examples, first wireless interface 220A may include a Wi-Fi 802.11 interface (e.g., 2.4 GHz and/or 5 GHz). Second wireless interface 220B may include a Bluetooth interface and/or a Bluetooth Low Energy (BLE) interface. However, these are given for example purposes only, and the disclosure is not limited in this respect. In some aspects, access point 200 may communicate with other access points using a Bluetooth and/or BLE interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 data storage 254, log controller 255, and NMS agent 256. Device status log 252 includes a list of network parameters and/or network events specific to access point 200. The network parameters may include, for example, any network parameter indicative of one or more aspects of performance of the wireless network. In some examples, network parameters may include a plurality of states measured periodically as time series data that can be translated into one or more SLE metrics. The network parameters may be measured by the client devices, the APs 106/200 or another device associated with the wireless network.

Network events may include, for example, access point events and/or client device events. The access point events and/or client device events may each include a log of normal network events, neutral network events, and/or error network events. The network events may include, for example, memory status, reboot events, crash events, Ethernet port status, upgrade failure events, firmware upgrade events, configuration changes, authentication events, DNS events, DHCP events, roaming events, etc., as well as a time and date stamp for each event. Log controller 255 determines a logging level for the device based on instructions from NMS 150. Data 254 may store any data used and/or generated by access point 200, including data collected from client devices of access point 200, such as data used to calculate one or more SLE metrics, that is transmitted by access point 200 for cloud-based management of wireless networks by NMS 150.

Communications manager 242 includes program code that, when executed by processor(s) 206, allow access point 200 to communicate with client devices and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and managed by NMS 150 to optimize wireless network performance in real-time, or on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

As described herein, AP device 200 may measure and report network data (i.e., network parameters and/or network event data) from status log 252 to NMS 150. The network data is indicative of one or more aspects of wireless network performance and/or status of the wireless network. The network data may be measured and/or determined by one or more of the client devices of an AP 200 and/or by one or more of the APs 200 in a wireless network. AP device 200 can provide the network data to NMS 150 for use in the techniques described herein.

In some examples, NMS agent 256 may periodically create a package of the statistical data according to a second periodic interval, e.g., every ninety seconds. In some examples, the package of statistical data may also include details about clients connected to network AP 200. NMS agent 256 may then report the package of statistical data to NMS 150 in the cloud. In other examples, NMS 150 may request, retrieve, or otherwise receive the package of statistical data from AP 200 via an API, an open configuration protocol, or another of communication protocols. The package of statistical data created by NMS agent 256 or another module of AP 200 may include a header identifying AP 200 and the statistics and data samples. In still other examples, NMS agent 256 reports event data to NMS 150 in the cloud in response to the occurrence of certain events at AP 200 as the events happen.

NMS agent 256 may receive data from NMS 150 that includes instructions for a neighboring network device to perform an action to remediate a lost connection associated with the neighboring device. For example, the neighboring device may have dropped, disconnected, or otherwise lost a connection with network 134 and/or NMS 150. NMS agent 256 can receive the data, which may include labels or a header indicating which neighboring network device of AP 200 is to receive the instructions. NMS agent 256 can send the instruction to a corresponding NMS agent of the neighboring network device, which can then perform the action or actions indicated in the instructions to remediate the lost connection.

In some aspects NMS agent 256 may receive, from NMS 150, the instructions for the neighboring network device via a first interface, and communicate the instructions to the NMS agent of the neighboring device via a second interface. As an example, NMS agent 256 may receive the instructions from NMS 150 via a wired interface and may send the instructions to the neighboring device via a wireless interface, such as a Bluetooth or BLE interface of AP 200. In some aspects, NMS agent 256 may provide the instructions to the neighboring device using a secure shell (SSH) protocol. In some aspects, NMS agent 256 may provide the instructions to the neighboring network device using LLDP.

Figure 3:
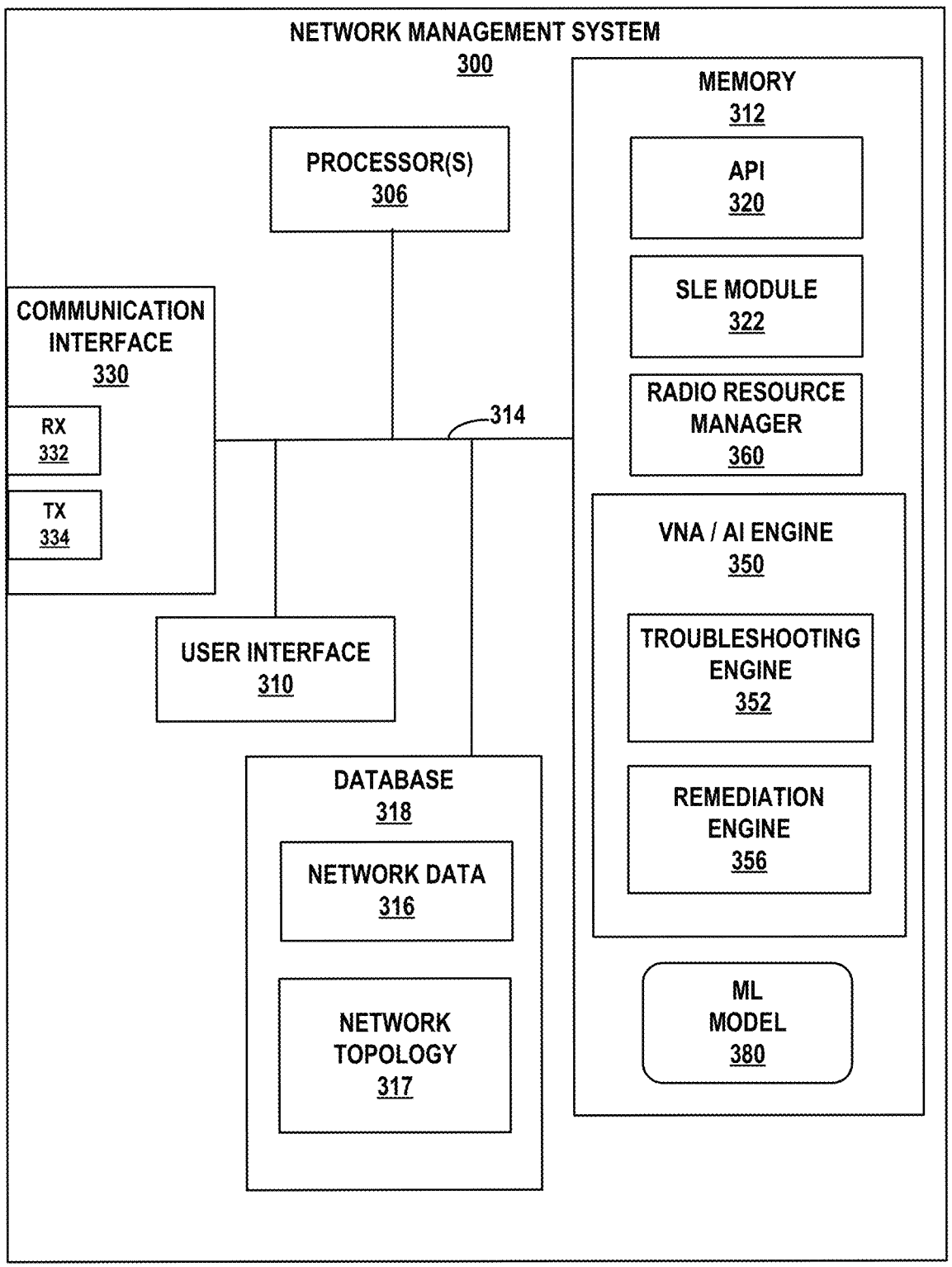
FIG. 3 is a block diagram of an example network management system, in accordance with one or more techniques of the disclosure.

FIG. 3 is a block diagram of an example network management system (NMS) 300 configured to provide a granular troubleshooting workflow at an application session level using an application session-specific topology from a client device to a cloud-based application server, in accordance with one or more techniques of the disclosure. NMS 300 may be used to implement, for example, NMS 150 in FIGS. 1A-1C. In such examples, NMS 300 is responsible for monitoring and management of one or more networks at sites 102A-102C, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of APs 106 (and their client devices), switches 104, routers 108 and other network nodes sites 102A-102C of FIGS. 1A-1C, which may be used to determine network connectivity, to calculate one or more SLE metrics and/or update network topology 317. NMS 300 analyzes this data for cloud-based management of the wired and wireless networks of sites 102A-102C. The received data, including telemetry data 130, is stored as network data 316 in database 318. Entity and connectivity information extracted from the telemetry data, is stored within network topology 317 in database 318. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of APs 106, switches 104. Routers 108, servers 110, 116, 122, 128 and/or any other network nodes, devices, or systems forming part of network system 100 such as shown in FIGS. 1A-1C. In some scenarios described herein in which network system 100 includes "third-party" network devices that are owned and/or associated with different entities than NMS 300, NMS 300 does not receive, collect, or otherwise have access to network data from the third-party network devices.

The data and information received by NMS 300 may include, for example, telemetry data 130 (FIG. 1A), SLE-related data, or event data received from one or more of APs 106, switches 104, routers 108, or other network nodes used by NMS 300 to remotely monitor the performance of wired and wireless networks at sites 102A-102C. NMS 300 may further transmit data via communications interface 330 to any of network devices such as APs 106, switches 104, routers 108, other network nodes within the wired and wireless networks at sites 102A-102C, and/or admin device 111 to remotely manage the wired and wireless networks.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In the example shown in FIG. 3, memory 312 includes an API 320, an SLE module 322, a virtual network assistant (VNA)/AI engine 350, and a radio resource management (RRM) engine 360. In accordance with the disclosed techniques, VNA/AI engine 350 includes troubleshooting engine 352 that determines root causes of network connectivity and/or performance issues in the wired and wireless networks of sites 102A-102C. Troubleshooting engine 352, in some examples, applies a ML model 380 to network data 316 and/or network topology 317 to perform troubleshooting of network connectivity or performance issues by identifying root causes of connectivity and performance issues at one or more of the network devices at sites 102A-102C. NMS 300 may also include any other programmed modules, software engines and/or interfaces configured for remote monitoring and management of wired and wireless networks of sites 102A-102C, including remote monitoring and management of any of APs 106/200, switches 104, routers 108, or other network devices.

SLE module 322 enables set up and tracking of thresholds for SLE metrics for each wired and wireless networks at sites 102A-102C. SLE module 322 further analyzes SLE-related data collected by network devices, such as any of APs 106, switches 104, and gateways 108. SLE module 322 may further analyze data from client devices in each wireless network of sites 102A-102C. This data is transmitted to NMS 300, which executes by SLE module 322 to determine one or more SLE metrics for APs 106, switches 104, and gateways 108. This SLE data can be stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network at a site 102 in order to identify potential issues with SLE coverage and/or capacity in the wireless network and to make adjustments to the radio settings of the access points at each site to address the identified issues. For example, RRM engine may determine channel and transmit power distribution across all APs 106 in each wireless network at sites 102A-102C. For example, RRM engine 360 may monitor events, power, channel, bandwidth, and number of clients connected to each AP 106. RRM engine 360 may further automatically change or update configurations of one or more APs 106 at a site 102 with an aim to improve the coverage and capacity SLE metrics and thus to provide an improved wireless experience for the user.

VNA/AI engine 350 analyzes data received from network devices as well as its own data to identify network devices that have lost or dropped connections to network 134 and/or NMS 150/300, and when undesired to abnormal states are encountered at one of the network devices. In some aspects, NMS 150 invokes VNA/AI engine 350 upon detection a dropped or lost network connection. In some aspects, NMS 150 may detect a dropped or lost connection in response to a timeout value associated with a network connection with the network device. For example, in some aspects, a network device periodically reports telemetry data 130 and other network data to NMS 150 at a predetermined interval. If NMS 150 fails to receive the telemetry data at the expected time (e.g., at the end of the predetermined interval), NMS 150 can determine that the network device has dropped or lost its connection with NMS 150. In some aspects, NMS 150 may detect a dropped or lost connection in response to polling a network device (e.g., polling via a network tunnel) and failing to receive a response from the network device.

VNA/AI engine 350 may identify the root cause of a lost or dropped connection. In addition, VNA/AI engine 350 may automatically invoke one or more corrective actions intended to address the identified root cause(s) of the lost or dropped connection. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

Troubleshooting engine 352 may further enable troubleshooting network devices at sites 102A-102C by identifying connectivity issues at one or more network devices at the sites. For example, application session troubleshooting engine 352 analyzes network data 316 of the network devices to identify root causes of the connectivity issues with the network devices. More specifically, troubleshooting engine 352 may analyze network data 316 to determine whether connectivity issues are present. In some scenarios, troubleshooting engine 352 may apply at least a portion of network data 316 to ML model 380 to determine root causes of the connectivity issues.

In some examples, ML model 380 may comprise a ML model that is trained using supervised or unsupervised machine learning techniques applied to training data comprising pre-collected, labeled network data received from network devices (e.g., client devices, APs, switches and/or other network nodes), to identify root causes of connectivity issues at network devices. ML model 380 may comprise one of a neural network, logistical regression, naïve Bayesian, support vector machine (SVM), or the like.

In the case of a connectivity or performance issue being detected at a network device, remediation engine 356 selects an action to remediate the connectivity or performance issue. In some aspects, the action may be commands or instructions to be performed by a disconnected network device that are intended to restore the network connection of the disconnected network device. In some examples, VNA/AI engine 350 may determine a remedial action based on the detected connectivity issue and/or a root cause determined for the detected connectivity issue. Remediation engine 356 can determine a network neighbor that is to serve as a relay to communicate the action to the network device that has lost or dropped its network connection. In some aspects, remediation engine 356 can select a nearest network neighbor to receive the instructions for relay to network device. The nearest network neighbor can be selected in various ways. For example, in some aspects, remediation engine 356 can utilize network topology 137 to select as the nearest neighbor a network device that is one hop away from the network device that has lost or dropped a network connection. As another example, remediation engine 356 can utilize signal strength (e.g., RSSI) to select as the nearest neighbor a network device that the greatest signal strength with the network device that has lost or dropped a network connection.

Remediation engine 356 may select instructions, commands, data etc. for remedial actions based, at least in part, on the type of hardware, manufacturer of the hardware, model, firmware version, operating system, or other characteristic of the network device that has lost its network connection to network 134 and/or NMS 150. As noted above, there may be multiple actions that can remediate the lost connection. In such cases, VNA 133 can select the action that has the least impact on (e.g., is the least disruptive to) the users of the network. For example, in the case of an access point, it is often less disruptive to reset a radio of the access point rather than resetting or rebooting the access point. Thus, VNA 133 may select resetting a radio on an access point when the root cause of the disconnection is the radio. In some aspects, the remedial actions may be arranged as a hierarchy of actions according to impact on the user. If remediation engine 356 determines that a first remedial action was not effective in restoring the network connection, remediation engine 356 can select the next remedial action in the hierarchy.

Remediation engine 356 can include the instructions, commands, data etc. in an information or data packet that is sent to the selected neighbor network device of the network device that has lost or dropped its network connection. The information or data packet can include a header or labels that identify, to the neighbor network device, the target network device that is to receive the action and associate instructions, commands and/or data.

In some aspects, the remedial action may include automatically generating a return materials authorization (RMA) and sending the RMA to an operator of a site instructing the operator to return the disconnected network device to the vendor of the device for further diagnosis and service. VNA/AI engine 350 may output the RMA and a notification of the connectivity issue and/or the root cause of the connectivity issue for display on admin device 111 (FIG. 1A) of the administrator.

Although the techniques of the present disclosure are described in this example as performed by NMS 300, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 300, or may be distributed throughout network 100, and may or may not form a part of NMS 300.

Figure 4:
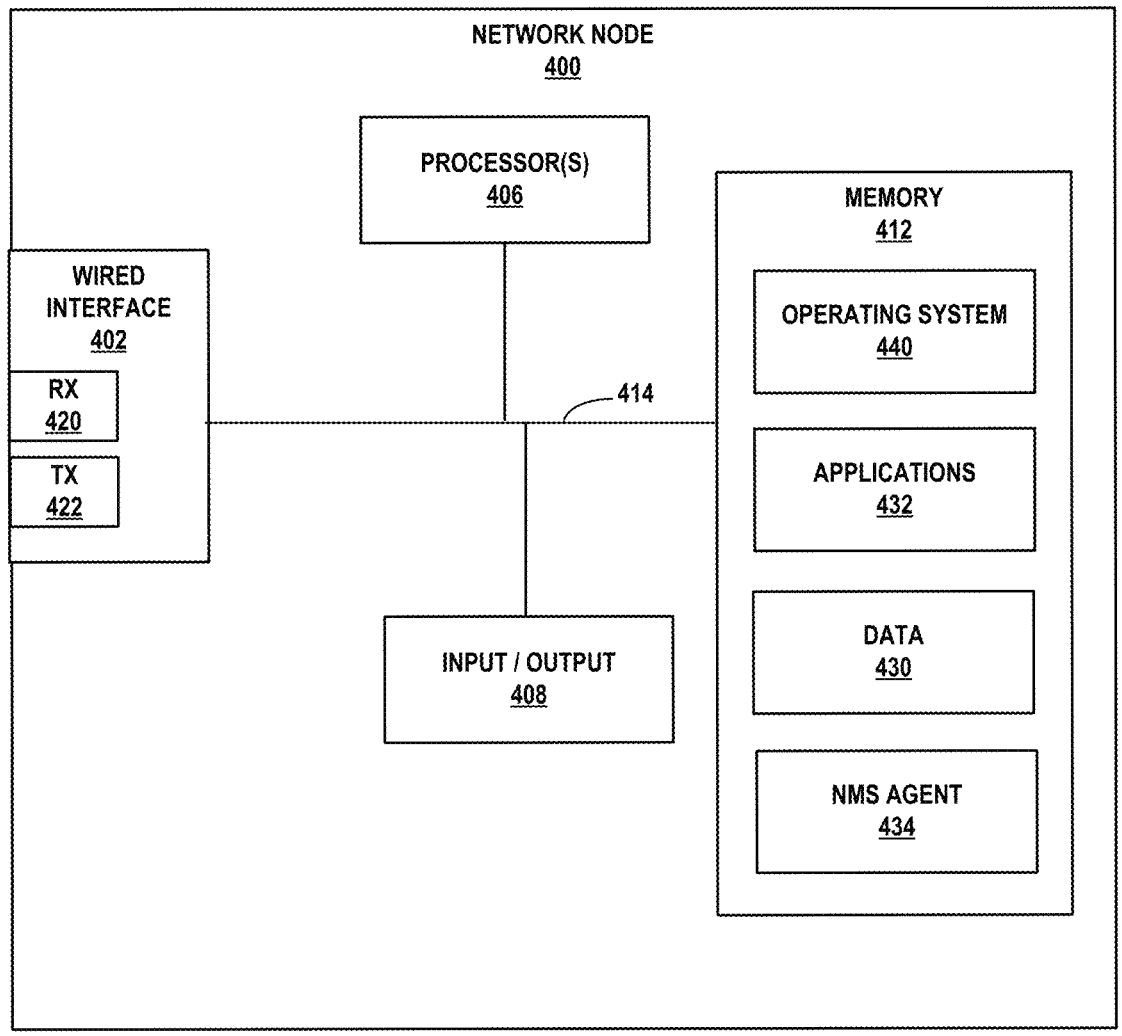
FIG. 4 is a block diagram of an example network node, such as a router, switch or server, in accordance with one or more techniques of the disclosure.

FIG. 4 is a block diagram illustrating an example network node (or server) 400 configured according to the techniques described herein. In one or more examples, the network node 400 implements a device or a server attached to the network 134 of FIGS. 1A-1C, e.g., router, switch, AAA server, DHCP server, DNS server, VNA, Web server, etc., or a network device such as, e.g., routers, switches or the like. In some embodiments, network node 400 of FIG. 4 is server 110, 116, 122, 128, of FIG. 1A or a routers 108 or switches 104 of FIGS. 1A-1C.

In this example, network node 400 includes a wired interface 402, e.g., an Ethernet interface, a processor 406, input/output 408, e.g., display, buttons, keyboard, keypad, touch screen, mouse, etc., and a memory 412 coupled together via a bus 414 over which the various elements may interchange data and information. Wired interface 402 couples the network node 400 to a network, such as an enterprise network. Though only one interface is shown by way of example, network nodes may, and usually do, have multiple communication interfaces and/or multiple communication interface ports. Wired interface 402 includes a receiver 420 and a transmitter 422.

Memory 412 stores executable software applications 432, operating system 440, NMS agent 434, and data/information 430. Data 430 may include a system log and/or an error log that stores event data, including behavior data, for network node 400. In examples where network node 400 comprises a "third-party" network device, the same entity does not own or have access to both the APs or wired client-side devices and network node 400. As such, in the example where network node 400 is a third-party network device, NMS 130 may not receive, collect, or otherwise have access to the network data 430 from network node 400.

In examples where network node 400 comprises a server, network node 400 may receive data and information, e.g., including operation related information, e.g., registration request, AAA services, DHCP requests, Simple Notification Service (SNS) look-ups, and Web page requests via receiver 420, and send data and information, e.g., including configuration information, authentication information, web page data, etc. via transmitter 422.

In examples where network node 400 comprises a wired network device, network node 400 may be connected via wired interface 402 to one or more APs or other wired client-side devices, e.g., switches, routers and/or IoT devices, within a wired network edge. For example, network node 400 may include multiple wired interfaces 402 and/or wired interface 402 may include multiple physical ports to connect to multiple APs or the other devices within a site via respective Ethernet cables. In some examples, each of the APs or other wired devices connected to network node 400 may access the wired network via wired interface 402 of network node 400. In some examples, one or more of the APs or other wired devices connected to network node 400 may each draw power from network node 400 via the respective Ethernet cable and a Power over Ethernet (PoE) port of wired interface 402.

The data collected and reported by network node 400 may include periodically-reported data and event-driven data. In some examples, network node 400 is configured to collect statistics and/or sample other data according to a first periodic interval, e.g., every 3 seconds, every 4 seconds, etc. Network node 400 may store the collected and sampled data, e.g., in a buffer. In some examples, NMS agent 434 may periodically create a package of the statistical data according to a second periodic interval, e.g., every 3 minutes. In some examples, the package of statistical data may also include details about clients connected to network node 400. NMS agent 434 may then report the package of statistical data to NMS 150 in the cloud. In other examples, NMS 150 may request, retrieve, or otherwise receive the package of statistical data from network node 400 via an API, an open configuration protocol, or another of communication protocols. The package of statistical data created by NMS agent 434 or another module of network node 400 may include a header identifying network node 400 and the statistics and data samples for each of the logical paths from network node 400. In still other examples, NMS agent 434 reports event data to NMS 150 in the cloud in response to the occurrence of certain events at network node 400 as the events happen.

Figure 5:
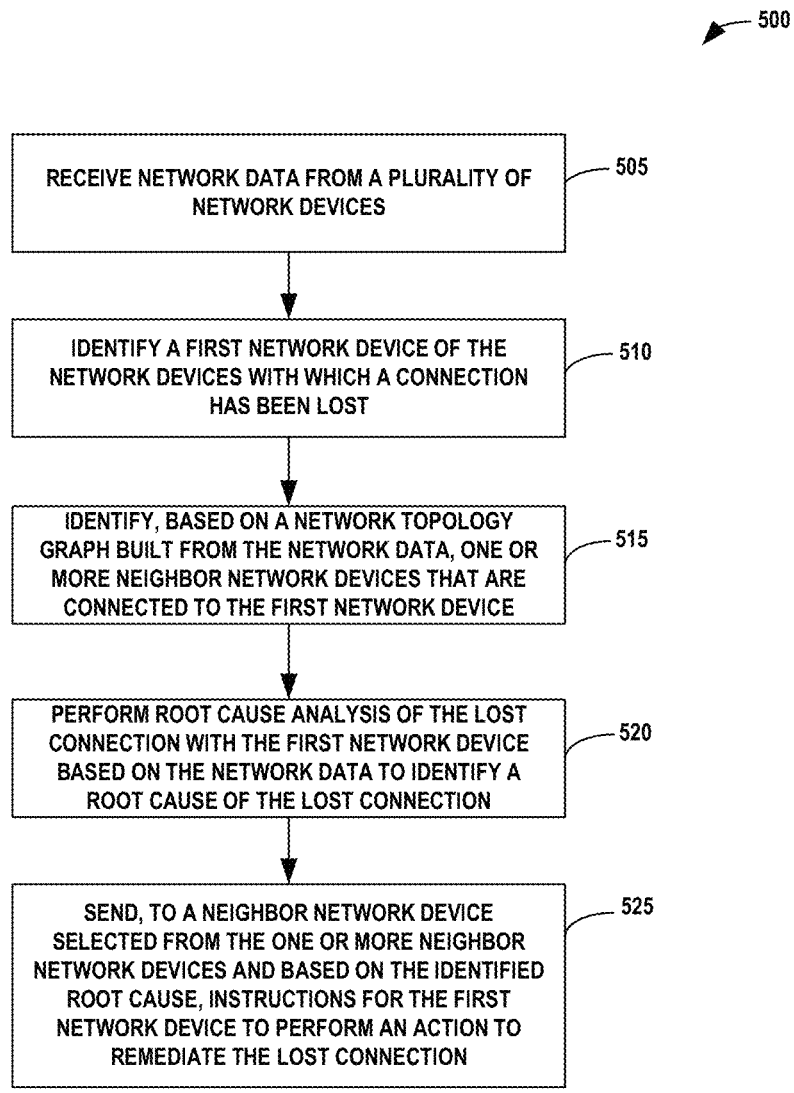
FIG. 5 is a flowchart illustrating operations for a network analysis system, according to one or more techniques of the disclosure.

NMS agent 434 may receive data from NMS 150 that includes instructions for a neighboring network device to perform an action to remediate a lost connection associated with the neighboring device. For example, the neighboring device may have dropped, disconnected, or otherwise lost a connection with network 134 and/or NMS 150. NMS agent 434 can receive the data, which may include labels or a header indicating which neighboring network device of network node 400 is to receive the instructions. NMS agent 434 can send the instruction to a corresponding NMS agent of the neighboring network device, which can then perform the action or actions indicated in the instructions to remediate the lost connection. In some aspects, NMS agent 434 may provide the instructions to the neighboring device using a secure shell (SSH) protocol. In some aspects, NMS agent 434 may provide the instructions to the neighboring network device using LLDP FIG. 5 is a flow diagram illustrating an example operation 500 of a NMS, in accordance with one or more techniques of this disclosure. NMS 150/300 may receive network data from a plurality of network devices configured to provide a network (505). Next, NMS 150/300 may identify a first network device of the plurality of network devices with which a connection has been lost (510). Next, NMS 150/300 may identify, based on a network topology graph built from the network data, one or more neighbor network devices of the plurality of network devices that are connected to the first network device (515). Next, NMS 150/300 may perform root cause analysis of the lost connection with the first network device based on the network data to identify a root cause of the lost connection (520). Next, NMS 150/300 may send, to a neighbor network device selected from the one or more neighbor network devices and based on the identified root cause, instructions for the first network device to perform an action to remediate the lost connection, wherein the neighbor network device communicates the instructions to the first network device (525).

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer readable medium, e.g., ROM, RAM, CDs, hard discs, etc., which include machine readable instructions for controlling a machine to implement one or more operations of a method.

The specific order or hierarchy of steps in the processes disclosed is an example of example approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, some examples may be practiced without these specific details. In other instances, well-known methods, procedures, components, units and/or circuits have not been described in detail for simplicity.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology-Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. The functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. In general, the systems, methods and techniques disclosed herein will work equally well for other types of communications environments, networks and/or protocols.

For purposes of explanation, numerous details are set forth in order to provide a thorough understanding of the present techniques. The present disclosure may be practiced in a variety of ways beyond the specific details set forth herein. Furthermore, while the examples illustrated herein show various components of the system collocated, the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, the components of the system can be combined into one or more devices, or split between devices, such as a transceiver, an access point, a station, a Domain Master, a network operation or management device, a node or collocated on a particular node of a distributed network, such as a communications network. For reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure applies to include corresponding and complementary transmitter-side or receiver-side functionality, respectively, in both the same transceiver and/or another transceiver(s), and vice versa.

The examples are described in relation to enhanced communications. However, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software, and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols, and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving troubleshooting and remediating connectivity issues with network devices. Many alternatives, modifications and variations would be or are apparent to those of ordinary skill in the applicable arts. Accordingly, this disclosure applies to all such alternatives, modifications, equivalents, and variations that are within the spirit and scope of this disclosure.

What is claimed is:

1. A system comprising:
a plurality of network devices configured to provide a network at a site; and
a network management system (NMS) comprising:
    a memory storing network data received from the plurality of network devices; and
    one or more processors coupled to the memory and configured to:
        identify a first network device of the plurality of network devices with which a network connection has been lost;
        identify, based on a network topology graph generated from the network data, one or more neighbor network devices of the plurality of network devices that are connected to the first network device;

perform root cause analysis of the lost connection with the first network device based on the network data to identify a root cause of the lost connection;

select one or more actions of a plurality of actions to remediate the lost connection based on the identified root cause of the lost connection, wherein the one or more actions are arranged as a hierarchy of actions according to impact on one or more users of the network;

select a neighbor network device from the one or more neighbor network devices that comprises a nearest neighbor of the first network device; and send, to the neighbor network device selected from the one or more neighbor network devices, instructions for the first network device to perform the selected one or more actions to remediate the lost connection, wherein the neighbor network device communicates the instructions to the first network device.

2. The system of claim 1, wherein the plurality of network devices comprises one of:
a plurality of access point (AP) devices at the site;
a plurality of network switch devices connected to one or more AP devices at the site; or
one of more AP devices at the site and one or more network switch devices connected to the AP devices.

3. The system of claim 1, wherein to identify the first network device of the plurality of network devices with which the network connection has been lost comprises to identify the first network device with which a network connection to a wide area network coupling the network management system to the first network device has been lost and which is locally connected to at least one of the plurality of network devices.

4. The system of claim 1, wherein the neighbor network device is configured to communicate the instructions to the first network device via a wired connection between the first network device and the neighbor network device.

5. The system of claim 1, wherein the neighbor network device is configured to communicate the instructions to the first network device via a wireless connection between the first network device and the neighbor network device.

6. The system of claim 5, wherein first network device comprises a first access point, and the neighbor network device comprises a second access point.

7. The system of claim 5, wherein the wireless connection comprises a Bluetooth Low Energy (BLE) connection.

8. The system of claim 1, wherein the first network device includes a first network management agent, wherein the neighbor network device includes a second network management agent, wherein the one or more processors are configured to send the instructions for the first network device to perform the selected one or more actions to the second network management agent, and wherein the second network management agent communicates the instructions for the first network device to perform the selected one or more actions to the first network management agent.

9. The system of claim 1, wherein, to select the neighbor network device that comprises the nearest neighbor of the first network device, the one or more processors are configured to select the neighbor network device from the one or more neighbor network devices that is nearest to the first network device according to the network topology.

10. The system of claim 1, wherein, to select the neighbor network device that comprises the nearest neighbor of the first network device, the one or more processors are configured to select the neighbor network device from the one or more neighbor network devices that is nearest to the first network device based on a signal strength between the neighbor network device and the first network device.

11. The system of claim 1, wherein, to select the neighbor network device that comprises the nearest neighbor of the first network device, the one or more processors are configured to select the neighbor network device from the one or more neighbor network devices that is not a third-party device.

12. A method comprising:
receiving, by processing circuitry of a network management system (NMS), network data from a plurality of network devices configured to provide a network;
identifying, by the processing circuitry, a first network device of the plurality of network devices with which a connection has been lost;
identifying, by the processing circuitry and based on a network topology graph built from the network data, one or more neighbor network devices of the plurality of network devices that are connected to the first network device;
performing, by the processing circuitry, root cause analysis of the lost connection with the first network device based on the network data to identify a root cause of the lost connection;
selecting, by the processing circuitry, one or more actions of a plurality of actions to remediate the lost connection based on the identified root cause of the lost connection, wherein the one or more actions are arranged as a hierarchy of actions according to impact on one or more users of the network;
selecting, by the processing circuitry, a neighbor network device from the one or more neighbor network devices that comprises a nearest neighbor of the first network device; and
sending, by the processing circuitry to the neighbor network device selected from the one or more neighbor network devices, instructions for the first network device to perform the selected one or more actions to remediate the lost connection, wherein the neighbor network device communicates the instructions to the first network device.

13. The method of claim 12, wherein identifying the first network device comprises identifying the first network device with which a network connection to a wide area network communicatively coupling the network management system to the first network device has been lost and which is locally connected to at least one of the plurality of network devices.

14. The method of claim 12, further comprising:
receiving, by the neighbor network device the instructions for the first network device to perform the selected one or more actions via a wired interface; and
communicating, by the neighbor network device, the instructions to the first network device via a wireless connection between the first network device and the neighbor network device.

15. The method of claim 12, wherein selecting the neighbor network device that comprises the nearest neighbor of the first network device further comprises selecting the neighbor network device from the one or more neighbor network devices that is nearest to the first network device according to the network topology.

16. The method of claim 12, wherein selecting the neighbor network device that comprises the nearest neighbor of the first network device further comprises selecting the neighbor network device from the one or more neighbor network devices that is nearest to the first network device based on a signal strength between the neighbor network device and the first network device.

17. The method of claim 12, wherein selecting the neighbor network device that comprises the nearest neighbor of the first network device further comprises selecting the neighbor network device from the one or more neighbor network devices that is not a third-party device.

18. A non-transitory computer-readable medium, having instructions stored thereon that, when executed, cause one or more processors to:
receive network data from a plurality of network devices configured to provide a network;
identify a first network device of the plurality of network devices with which a connection has been lost;
identify, based on a network topology graph built from the network data, one or more neighbor network devices of the plurality of network devices that are connected to the first network device;
perform root cause analysis of the lost connection with the first network device based on the network data to identify a root cause of the lost connection;
select one or more actions of a plurality of actions to remediate the lost connection based on the identified root cause of the lost connection, wherein the one or more actions are arranged as a hierarchy of actions according to impact on one or more users of the network;
select a neighbor network device from the one or more neighbor network devices that comprises a nearest neighbor of the first network device; and
send, to the neighbor network device selected from the one or more neighbor network devices and based on the identified root cause, instructions for the first network device to perform the selected one or more actions to remediate the lost connection, wherein the neighbor network device communicates the instructions to the first network device.

19. The non-transitory computer-readable medium of claim 18, wherein the instructions to cause the one or more processors to identify the first network device comprise instructions to cause the one or more processors to identify the first network device with which a network connection to a wide area network communicatively coupling the network management system to the first network device has been lost and which is locally connected to at least one of the plurality of network devices.

* * * * *